(12) United States Patent
Miskic

(10) Patent No.: US 12,077,075 B2
(45) Date of Patent: Sep. 3, 2024

(54) CAR SEAT BLANKET APPARATUS

(71) Applicant: Ivana Miskic, Conyers, GA (US)

(72) Inventor: Ivana Miskic, Conyers, GA (US)

( * ) Notice: Subject to any disclaimer, the term of this patent is extended or adjusted under 35 U.S.C. 154(b) by 0 days.

(21) Appl. No.: 18/487,230

(22) Filed: Oct. 16, 2023

(65) Prior Publication Data

US 2024/0116417 A1 Apr. 11, 2024

Related U.S. Application Data

(63) Continuation of application No. 17/585,138, filed on Jan. 26, 2022, now Pat. No. 11,858,389.

(51) Int. Cl.
*B60N 2/60* (2006.01)
*A47G 9/02* (2006.01)
*B60N 2/26* (2006.01)

(52) U.S. Cl.
CPC ......... *B60N 2/6009* (2013.01); *A47G 9/0223* (2013.01); *B60N 2/26* (2013.01); *B60N 2/6027* (2013.01)

(58) Field of Classification Search
CPC ...... B60N 2/6009; B60N 2/6027; B60N 2/26; A47G 9/0223

USPC .................................................. 297/256.15
See application file for complete search history.

(56) References Cited

U.S. PATENT DOCUMENTS

| | | |
|---|---|---|
| 4,993,090 A | 2/1991 | Ranalli |
| 5,161,258 A | 11/1992 | Coltrain |
| 6,394,543 B1 | 5/2002 | Dunne et al. |
| 7,384,098 B1 | 6/2008 | Allwin |
| 8,251,457 B2 | 8/2012 | Britton et al. |
| 9,238,424 B1 | 1/2016 | Foster et al. |
| 10,358,056 B1 | 7/2019 | Hands et al. |
| 10,874,230 B2 | 12/2020 | Green |
| 2011/0049950 A1 | 3/2011 | Pereira |
| 2015/0076877 A1 | 3/2015 | Ferraro et al. |
| 2016/0288679 A1 | 10/2016 | White |
| 2016/0362024 A1 | 12/2016 | Simon et al. |
| 2019/0125108 A1 | 5/2019 | Thomas et al. |

OTHER PUBLICATIONS

U.S. Appl. No. 17/585,138 (2023/0302976), filed Jan. 26, 2022 (Sep. 28, 2023), Ivana Miskic.

*Primary Examiner* — Mark R Wendell
(74) *Attorney, Agent, or Firm* — Ballard Spahr LLP

(57) ABSTRACT

A blanket for covering a child in a car seat. The blanket comprises one or more coupling elements through which straps of a harness may be passed, thus enabling the blanket and the harness to be fastened tightly around the child, thereby safely restraining the child.

20 Claims, 4 Drawing Sheets

CAR SEAT BLANKET APPARATUS

CROSS REFERENCE TO RELATED PATENT APPLICATION

This application is a continuation of U.S. application Ser. No. 17/585,138, filed Jan. 26, 2022, which is herein incorporated by reference in their entirety.

BACKGROUND

In many situations, the use of a car seat with a restraint system is now required by law when transporting a child in a vehicle. Children meeting certain age and weight limits must be restrained in a specialized seat fastened to appropriate anchor points in the vehicle. Laws involving installation and use of child car seats are quite complex and rigorously enforced. Proper installation and fit compel that only one or two finger widths of leeway separate the car seat straps from the body of a child positioned therewithin. This rather "tight" fit is required to assure the safety of a child riding in a car seat. During winter months or cold, damp conditions, it is difficult to properly place a child within a car seat, owing to the presence of winter clothing such as jump suits, jackets and the like. When positioning the child in a car seat during cold weather, the straps must painstakingly be adjusted to compensate for the additional outer garments worn.

Modern child car seat restraint systems are designed to restrain the child's torso in the car seat, while leaving the head and limbs free to move naturally. In order to provide proper restraint, the restraining members must be tightly fitted to the child's torso.

In order to meet today's rigid safety requirements, most child car seats are equipped with a restraint system (or "harness") that has either three or five anchor points. In the three-point system, a first restraining member (or "harness element") (either a strap or a post) is anchored to the seat and extends upward between the child's legs at the crotch. Second and third harness elements are anchored to the backrest portion of the seat and extend over the left and right shoulders of the child. The three harness elements are joined together by one or more suitable buckles or clasps in front of the child's torso. The lengths of the harness elements are adjusted to hold the child's torso tightly in the car seat, while permitting free movement of the head and limbs. There are several variations of this basic three-point system. For example, the harness may be provided with a T-shaped pad at the intersection of the three harness elements; additional means may be provided for conveniently positioning the shoulder straps; and the buckle/closure means may be located at the base of the crotch element.

In the five-point system, additional fourth and fifth harness elements, anchored to the seat/backrest of the car seat, extend around the lower portion of the child's torso, below the arms. These elements are joined with the first three harness elements in front of the child's torso. The fourth and fifth elements provide added restraint against lateral movement of the torso, while permitting free movement of the head and limbs.

Proper restraint of the child is readily accomplished with both three-point and five-point harness systems, provided the child is clothed in conventional, fitted attire. However, a child that is wrapped in a blanket cannot be properly restrained. That is to say, the blanket (or in some cases, a puffy coat) interfering with the operation of the harness system may create a dangerous situation. It is necessary to remove the blanket from around the child, fasten the harness around the unwrapped child, and then attempt to tuck the blanket over the child and the harness. The blanket cannot provide continuous coverage of the child's shoulders, back and buttocks. Alternatively, if the restraint harness is placed over the blanket in which the child is wrapped, the restraint cannot be properly applied. The crotch harness member cannot be properly positioned between the child's legs, and the child's arms are trapped beneath both blanket and harness.

SUMMARY

Disclosed herein is an apparatus, system, and method which provides a blanket that is particularly useful for covering a child in a car seat fitted with a restraint system, but which can also be used for other purposes. Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

The present apparatus provides a travel blanket that is frontward donned on an infant strapped in a car seat (or stroller, etc.) by inserting restraining straps into one or more coupling elements on the travel blanket. Accordingly, the travel blanket's construction functions require minimal manipulation and movement of the infant when the blanket is being applied, while ensuring that the travel blanket does not shift and expose the infant to the cold or pose a suffocation risk. The travel blanket comprises coupling elements featuring various fastening means and an open back construction so that it can be readily donned upon an infant buckled within a seat without the need to adjust safety straps. The travel blanket may include a base section constructed with a base periphery which may be integrated with base stabilization means therein for securing the base section of the blanket onto an outer, exterior bottom portion of the seat so that the blanket is secured over the infant without the need to move the infant's body or legs. Lateral sections of the travel blanket may further include lateral perimeters appointed for aiding in securing the lateral sections over the infant.

In one aspect, the apparatus provides a blanket for wrapping a child restrained in a child's car seat. The car seat may comprise one or more restraining members. For example, the one or more restraining members may comprise one or more straps (e.g., canvas straps or the like as is known in the art). The one or more restraining members may be anchored to the car seat and can be releasably secured to each other to provide a restraining harness around a child placed in the seat. The one or more restraining members may be anchored to the car seat via one or more anchoring members. For example, the one or more anchoring members may be configured to secure one or more ends of the one or more restraining members to the car seat. For example, the one or more anchoring members may comprise The blanket may comprise one or more coupling elements. The one or more coupling elements may be configured to receive the one or more restraining members. For example, a restraining member of the one or more restraining members may be passed through the one or more coupling elements. As such, when a child is restrained in the seat, the blanket may be secured to both the child (e.g., wrapped around the child) and the one or more restraining members.

The blanket may comprise (a) an interior portion (e.g., first surface) which, via the coupling elements is affixed to the straps of the harness such that the first surface faces the torso of the restrained child, and (b) a second surface which is opposite the one or more coupling elements such that when the blanket is fixed to the harness, the second surfaces faces out (e.g., faces away from the torso of the restrained infant or child) which can be wrapped around the child outside the restraining members after the restraining members have been secured to each other to provide the restraining harness around the child.

A blanket as described above can be secured to the one or more restraining members, with the one or more restraining members of the harness having been passed through it, thereby being configured for a child to be placed in the seat below the interior portion of the blanket. For example, after the child has been placed in the seat, the restraining members may be secured to each other around the child, and the exterior portion of the blanket is wrapped around the child.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1A:
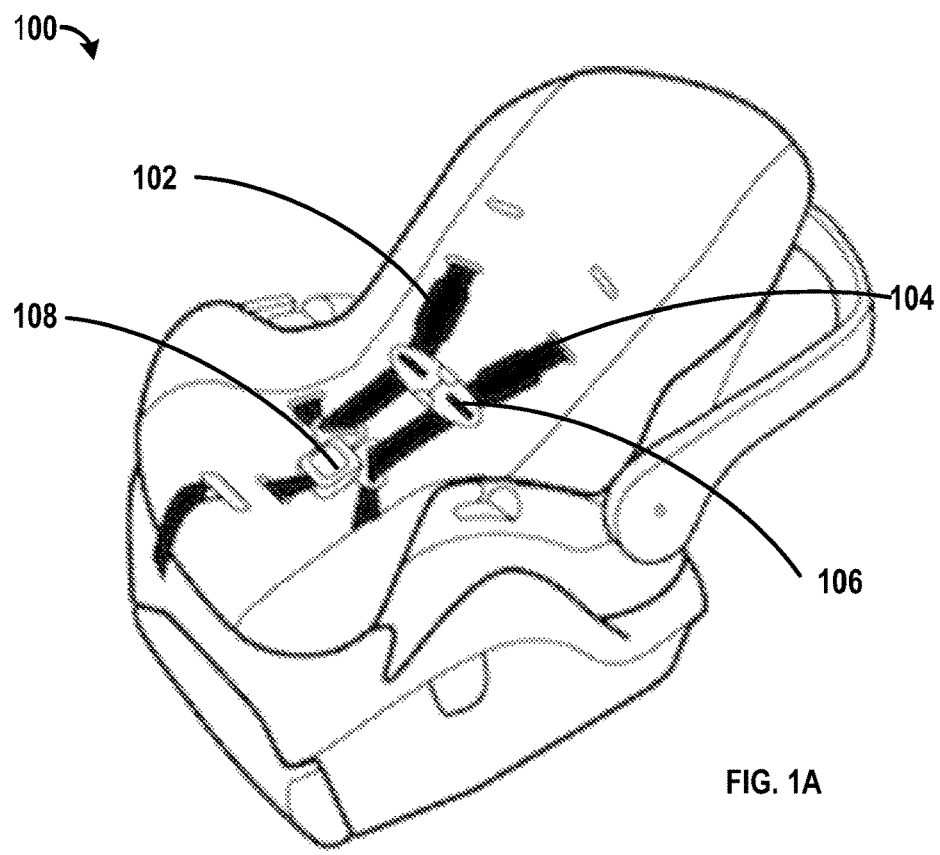
FIG. 1A shows a front view of an example car seat.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used throughout, the singular forms "a," "an," and "the" include plural referents unless the context clearly dictates otherwise. Thus, for example, reference to "a coupling element" can include two or more such coupling elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

As used herein, the terms "optional" or "optionally" mean that the subsequently described event or circumstance may or may not occur, and that the description includes instances where said event or circumstance occurs and instances where it does not.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

FIG. 1A shows an exemplary car seat 100 to which a blanket (e.g., an apparatus) may be attached. The car seat may comprise one or more straps. For example, the car seat may comprise a first strap 102, a second strap 104, and a third strap 105. The car seat may comprise a belt immobilization element 106 configured to reduce the movement, while in use, of the straps with respect to each other or a seated child. The car seat may comprise a buckle 108 configured to receive one or more ends of the one or more straps. For example, the buckle 108 may be configured to receive an end of the first strap 102, an end of the second strap 104, and an end of the third strap 105 and secure the respective ends in place (e.g., "buckle" the ends) so as to secure a seated child.

The car seat may comprise an upper portion and a lower portion. Each of the upper portion and the lower portion may be configured to have a height, width, and thickness such that the respective portion may accommodate a sitting person (e.g., a seated child). For example, the lower portion may be made of a material capable of supporting the weight of a person, for example a seated child. For example the lower portion may be made of a sturdy plastic or rubber. One skilled in the art will appreciate that any suitable material may be used. The lower portion may be configured to be releasably coupled to a vehicle as is known in the art.

Figure 1B:
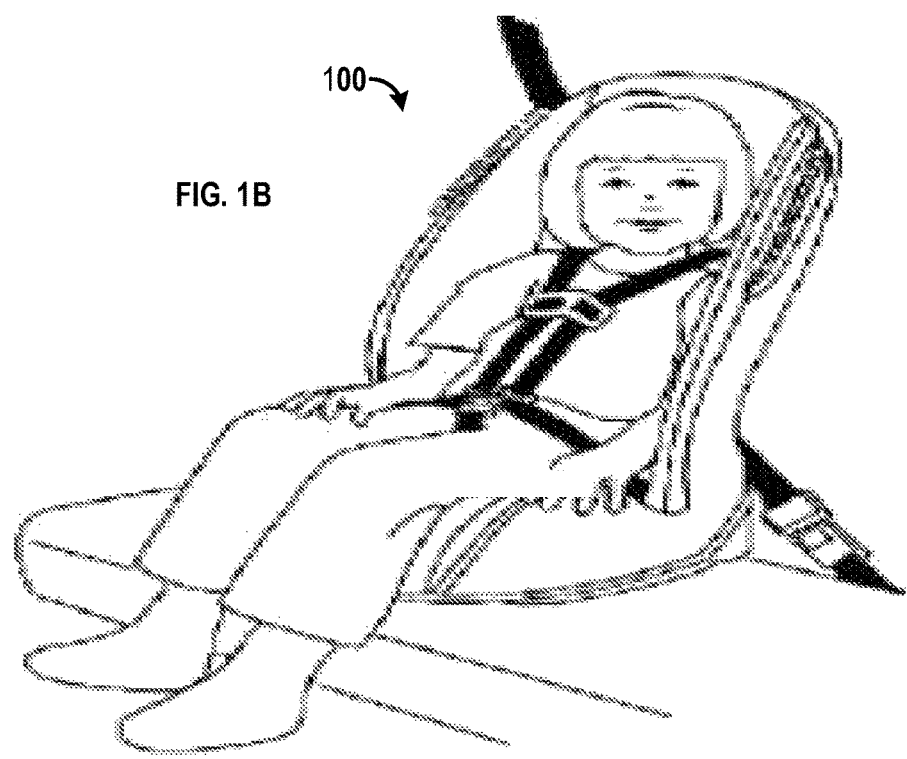
FIG. 1B shows a front view of an example car seat.

The upper portion may be disposed in proximity to the lower portion. The upper portion may be joined to the lower portion. The upper portion and lower portion may be configured to move in relation to each other to provide for adjustments in a sitting angle of the seated child. For example, the upper portion may be disposed at an angle to the lower portion such that a person (e.g., a child) may be seated in the seat (as is shown in FIG. 1B). For example, the upper portion may, in use, be disposed approximately parallel to a seatback of a vehicle seat. For example the upper portion may have a height, width, and thickness such that the upper portion may accommodate a sitting person (e.g., a seated child). For example, the upper portion may be made of a material capable of supporting the weight of a person, for example a seated child. For example the upper portion may be made of a sturdy plastic or rubber. One skilled in the art will appreciate that any suitable material may be used. The upper portion may be configured to be releasably coupled to a vehicle as is known in the art. In an embodiment, the car seat is comprised of a single piece comprising the upper portion and lower portion. In an embodiment, the car seat is comprised of one or more pieces comprising the upper portion and the lower portion.

The first strap 102 and the second strap 104 may each comprise, for example, a polyester strap, a canvas strap, combinations thereof, and similar restraining straps as are known in the art. The aforementioned example is merely exemplary and explanatory and is not limiting. A person skilled in the art will appreciate that each of the first strap 102 and the second strap 104 may each comprise any suitable material, for example plastic, metal, canvas, or any other suitable material. Each of the first strap 102 and the second strap 104 may comprise a proximal end and a distal end. The first strap 102 may, at the proximal end, be attached to an upper portion of the seat element 101. Likewise, the second strap 104 may be attached at the proximal end to the upper portion of the seat element 101. The first strap 102 may, at the distal end, be attached to a lower portion of the seat element 101. Likewise, the second strap 104 may, at the distal end, be attached to a lower portion of the seat element 101. The first strap 102 and second strap 104 may be disposed generally parallel to each other as shown.

The buckle 108 may be configured to receive a distal portion of the first strap 102 and the second strap 104 so as to secure the first strap 102 and the second 104 in place during use (e.g., while restraining a child or infant). In an embodiment, the distal portion of the first strap 102 and the distal portion of the second strap 104 may terminate in a coupling device (such as a buckle as is known in the art). The buckle 108 may be configured with a mechanical or electromechanical device which may be activated by the insertion of the distal ends of the first strap 102 and the second strap 104. For instance, a mechanism disposed on the interior of the buckle may engage so as to lock the respective distal ends of the first strap 102 and the second strap 104 in place during use. Further, the buckle may comprise an unlocking mechanism which is configured to, when activated, release the respective distal ends of the first strap 102 and the second strap 104, as is known in the art.

The first strap 102 and the second strap 104 may comprise any elongate member which may be attached, at both the proximal end and the distal end, to at least the upper portion of the seat element 102 and the buckle. In an embodiment, the first strap 102 and the second strap 104 may attached directly to a lower portion of the seat element 101. For example, the lower portion of the seat element 101 may configured to support to weight of a seated child or infant, such as in a seat or chair, as is known in the art. Likewise, the upper portion of the seat element 101 may be configured to act as a backrest of an infant or child, as is known in the art. FIG. 1B shows an example of the car seat 100 in use. As can be seen, the car seat 100 may be configured to be secured to a vehicle seat, for instance by way of a safety belt, as is known the in the art. The car seat 100 may be configured to accommodate a seated person such as a child.

Figure 2A:
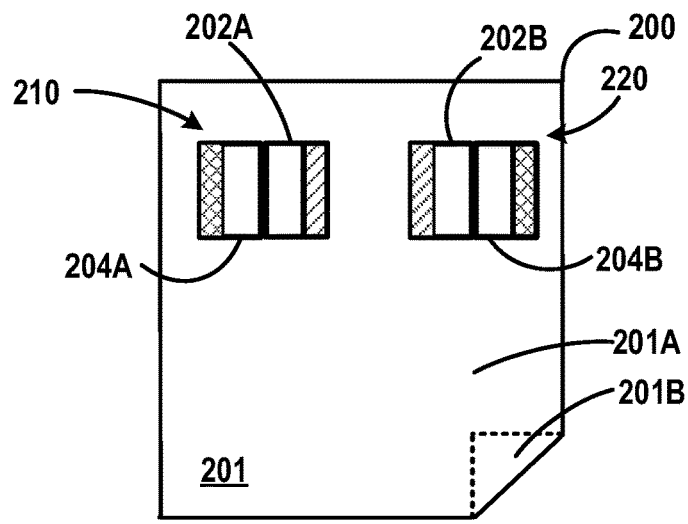
FIG. 2A shows a rear view of an example apparatus.

FIG. 2A shows an example restraint apparatus 200. The restraint apparatus 200 may comprise a blanket 201. The restraint apparatus 200 may comprise a cover element comprising a first surface 201A and an opposing second surface 201B. The cover element may be made of any material such as a suitable polyester, cloth, fabric (e.g., cotton, nylon, polyester, combinations thereof and the like). The cover element may comprise a single piece or one or more joined pieces of material (e.g., sheets of fabric). A first piece can define the first surface 201A, and a second piece can define the second surface 201B. The blankey may comprise one or more layers, one or more pieces, combinations thereof, and the like. For example, the first surface 201A may be defined by a first piece, and the second surface 201B may be defined by a second piece joined to the first piece. As another example, the first surface 201A and the second surface 201B may be different sides of a single unitary, monolithic piece of material. For embodiments in which the first surface 201A and the second surface 201B are defined by separate pieces, the separate pieces may be joined by any means. For example, the first surface 201A may be joined to the second surface 201B by stitching, adhesives, zippers, or any other suitable means for joining the two pieces. The blanket The first surface 201A may be the child-facing surface (e.g., a "rear" surface) and the second surface 201B may face away from the child (e.g., a "front" surface). While the terms front and rear are used with respect to the first and second surface, it is to be understood the apparatus 200 may be used with the surface 201B facing towards the seated child or away from the seated child. The words front and rear are intended to merely convey a relationship between the two surfaces but it is to be understood that either the first surface 201A or the second surface 201B may be either the first side or the reverse side. That is to say, the orientation of the blanket is arbitrary, although standard use may call for the bottom surface to be face-down (e.g., facing the restrained child or infant). The first surface 201A and the second surface 201B may each be rectangular or generally rectangular in shape and aligned along their respective horizontal and vertical axes such that the edges (e.g., sides) of the first surface 201A and the sides of the second surface 201B are aligned.

The restraint apparatus 200 (e.g., the blanket) may comprise a first coupling element 210 and a second coupling element 220. In FIG. 2A, and as described further below, the first coupling element 210 and the second coupling element 220 are show in an open position. The first coupling element may comprise a stationary base piece 202A and movable piece 204A. For example, the stationary base piece 202A may be fixed to the blanket (e.g., fixed to either the first surface or the second surface) and the movable piece 204A can be movable relative to the stationary base piece 202A. For example, the stationary base piece 202A may be sewn, glued, or otherwise secured to the blanket. For example, the stationary based piece may be entirely fixed to the blanket by way of stitching every edge of one or more edges of the stationary base piece 202A to the blanket. Movable piece 204A however, may be fixed to the blanket so that the movable piece 204A may move (e.g., pivot about an edge of the moveable piece 204A, rotate about an axis of the moveable piece 204A) with respect to either or both of the blanket and/or the stationary base piece 202A. For example, the movable piece 204A may comprise one or more edges. A first edge of the one or more edges may be fixed to the blanket. For example, the first edge may be in proximity to (e.g., next to) an edge of the stationary base piece 202A. For example, a second edge of the movable piece 204A may not be fixed so as to rotate about the secured first edge. The second edge of the movable piece 204A may be configured to, after movement, meet a second edge of the stationary base piece 202A. Similarly, the second coupling element 220 may comprise a stationary base piece 202B and a movable piece 204B configured similarly to coupling element 210 such that the movable piece 204B may move in relation to the stationary base piece 202B and such that an edge of movable piece 204B may meet, and be secured to, an edge of stationary base piece 202B.

The first coupling element 210 and the second coupling element 220 may be disposed anywhere on either the first surface 201A and/or the second surface 201B. For example, in one aspect, the first coupling element and the second coupling element may be disposed on the first surface 201A. In some aspects, the first coupling element and the second coupling element may be disposed in proximity to each other (e.g., less than 12 inches of distance between the first coupling element and the second coupling element), so as to accommodate the straps of the restraint harness.

The first coupling element and the second coupling element may be any shape. In one embodiment, the first coupling element 210 and the second coupling element 220 are substantially regular in shape so as to accommodate the first strap 102 and the second strap 104, respectively. For example, the movable piece 204A may be releasably joined to the stationary base piece 202A to form a first slot configured to close around the first strap 102 (as seen in FIG. 2C).

Figure 2B:
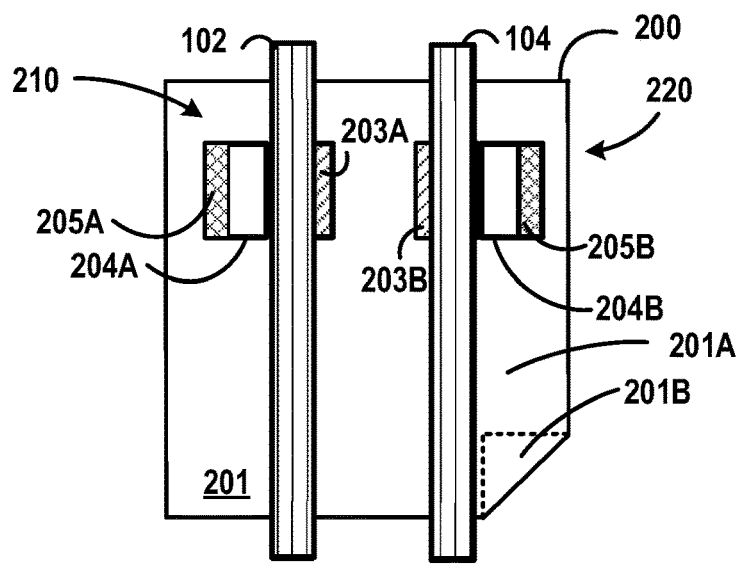
FIG. 2B shows a rear view of an example apparatus.
Figure 2C:
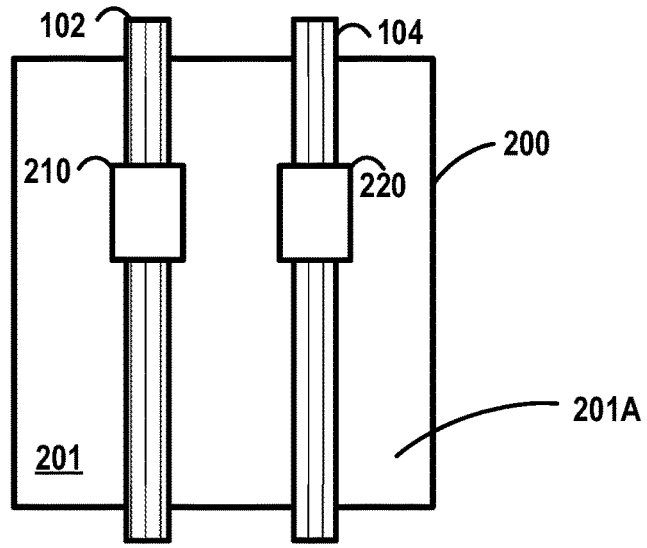
FIG. 2C shows a rear view of an example apparatus.

For example, as seen in FIG. 2B, by placing the blanket in proximity to the first strap 102 and the second strap 104, and laying the first strap 102 and the second strap 104 over the first coupling element 210 and the second coupling element 220, respectively, and securing the movable piece 204A to the stationary base piece 202A, and securing the movable piece 204B to the stationary base piece 202B, the restraint apparatus 200 may be secured to the car seat 100.

Each of the first coupling element 210 and the second coupling element 220 may comprise a soft, and/or padded material so as to prevent either of the first strap 102 or the second strap 104 from rubbing against the child. In operation, the first and second coupling elements may snuggly and securely receive the straps of the car seat and a central section of the blanket may rest against the infant's neck, chest, front torso, legs and feet. As the coupling elements snuggly receive the straps, the blanket does not need further securement; although, securement means may be integrated within the blanket as discussed herein. The lateral sections and base section extend over the infant and the seat and, in a first aspect of the invention, become disposed over the exterior and sides of the seat. In a second, optional, aspect of the invention, the lateral sections and base section are adapted to be secured onto the exterior or outside of the seat. The latter construction facilitates avoiding any need for adjusting the safety straps and jostling, struggling with or otherwise disturbing the infant, while providing a warm, safe environment for the infant during travel.

FIG. 2B shows a rear view of an example of the restraint apparatus 200 shown in use in relation to the first strap 102A and the second strap 102B. Both the first coupling element 210 and the second coupling element 220 are shown in the open position. The first coupling element 210 may comprise one or more fastening elements (e.g., a first fastening element 203A and a second fastening element 205A). The second coupling element 220 may comprise one or more fastening elements (e.g., a first fastening element 203B and a second fastening element 205B). The first fastening element 203A may be disposed on the stationary base piece 202A and the second fastening element 205A may be disposed on the movable piece 204A. Similarly, a first fastening element 203B may be disposed on the stationary based piece 202B and the second fastening element 205B may be disposed on the movable piece 204B.

In use, the one or more fastening elements (e.g., 203A, 203B, 205A, and 205B) may comprise fasteners such as hook-and-loop fasteners, buttons, zippers, snaps, combinations thereof, and the like.

For example, the first fastening element 203A may comprise one or more hook components of a hook-and-loop fastener and the second fastening element 205A may comprise one or more loop components of the hook-and-loop fastener. Thus, when closed (as seen in FIG. 2C), the first coupling element 210 and the second coupling element 220 may be configured to receive the first strap 102 and the second strap 104. For example, each of the first coupling element 210 and the second coupling element 220 may be configured such that the respective strap may pass over the respective stationary base piece 202A, 202B, and the respective movable piece 202B, 204B may be laid on top of the respective strap such that the respective strap rests between the respective stationary base piece and the respective movable piece. Either of the movable piece 202B or the movable piece 204B may be moved (e.g., folded) over the respective stationary bottom piece (e.g., the stationary bottom piece 202A or the stationary bottom piece 204B) such that either of the first strap 102 or the second strap 104 rests between either of the stationary bottom piece 202A and the moveable piece 202B or the stationary bottom piece 204A and the movable piece 204B. Thus, a first strap slot and a second strap slot may be formed by the joining of a stationary base piece (e.g., the stationary base piece 202A or the stationary base piece 202B) and the respective movable piece (e.g., the movable piece 204A or the movable piece 204B). Thus, the first strap slot and/or the second strap slot may be a circumferential space that encloses a respective strap.

One or more of the first coupling element 210 or the second coupling 220 may be configured one or more anti-slip components. For example, one or more first coupling element and the second coupling element 220 may comprise one or more surfaces configured to contact either or both of the first strap 102 and/or the second strap 104 and reduce movement of the first strap 102 and/or the seconds trap 104 with respect to a respective coupling element (and therefore, the apparatus 200 generally). For example, a surface of the one or more surfaces may comprise a textured surface such as a rubber piece with raised portions (e.g., bumps). For example, the textured surface may be disposed on a surface of either or both of the first stationary pieces (202A and 202B) and/or either or both the moveable pieces (204A and 204B). In an embodiment, either or both of the stationary base pieces 202A and 202B and/or the moveable pieces 204A and 204B may comprise elastic components configured to restrict and/or "grip" a respective strap 102 or 104.

Each of the first coupling element 210 and the second coupling element 220 may be disposed on a surface of the blanket 200. In some aspects, both the first coupling element and the second coupling element may be disposed on the same surface. For example, both the first coupling element and the second coupling element may be disposed on the first surface 201A. Both the first coupling element and the second coupling element may be affixed to the first surface 201A by any means. For example, both the first coupling element and the second coupling element may be affixed to the first surface 201A by way of stitching. For example, the stationary base piece 202A of the first coupling element may be sewn onto the first surface 201A of the blanket 200. Likewise, the stationary base piece 204A of the second coupling element may be sewn onto the first surface 201A of the blanket 200. Other means of affixing the first coupling element and the second coupling element to the first surface are also contemplated. For example, the stationary base piece 202A may be affixed to the first surface by any means. Likewise, the stationary based piece 204A may be affixed to the first surface by any means. The means for affixing any of the stationary base pieces 202A, 204A may include any of the following: stitching, adhesives (e.g., glue, tape), binding agents such as heat-sensitive binding agents, mechanical means such as staples or any other suitable means of affixing the stationary base piece 202A or the stationary base piece 204A to the first surface.

In an additional embodiment, the first coupling element and the second coupling element may be removably (e.g., releasably) affixed to the first surface 201A by any suitable removable means. For example, suitable removable means may include buttons, clips, clasps, zippers, ties, drawstrings, temporary adhesives, combinations thereof, and the like.

Each of the first coupling element or the second coupling element may have a minimum size so as to accommodate the first strap 102 and/or the second strap 104. Generally, the first strap 102 and the second strap 104 will have the same dimensions and be disposed proximal to each other such that they are essentially parallel. When a movable piece (e.g., the movable piece 202B or the movable piece 204B) is joined to the respective stationary base piece 202A, 202B), the coupling element may form a "cuff" or "aperture" (e.g., first cuff or second cuff; first aperture or second aperture) through which either of the first strap 102 or the second strap 104 may pass, thereby securing the cover element of the blanket to the car seat.

Each of the first aperture and the second aperture may be adjusted. For example, each of the first aperture and the second aperture may be expanded for easier passage of the restraining member there through, or so that two (or even more) restraining members can be passed through the same aperture) or to accommodate a variety of different harnesses and car seats. Each of the first aperture and the second aperture have a diameter in the horizontal direction of at least 3 inches so that a restraining member may be passed through it.

FIG. 2C shows an exemplary embodiment where the first strap 102 and the second strap 104 have been passed through the aperture (e.g., the circumferential space) created by the closure of the first coupling element 210 and the second coupling element 220. For example, the first strap 102 has been passed through the first coupling element 210. That is to say, in FIG. 2C, it can be seen that the first strap 102 was laid over the stationary bottom piece 202A and then the movable piece 202B was laid over the first strap 102 and joined to the stationary bottom piece 202A so as to retain the first strap 102. Likewise, it can be seen that the second strap 104 was laid over the stationary bottom piece 204A, then, the movable piece 204B was laid over the second strap 104 and joined to the stationary bottom piece 204A so as to retain the second strap 104.

Figure 3:
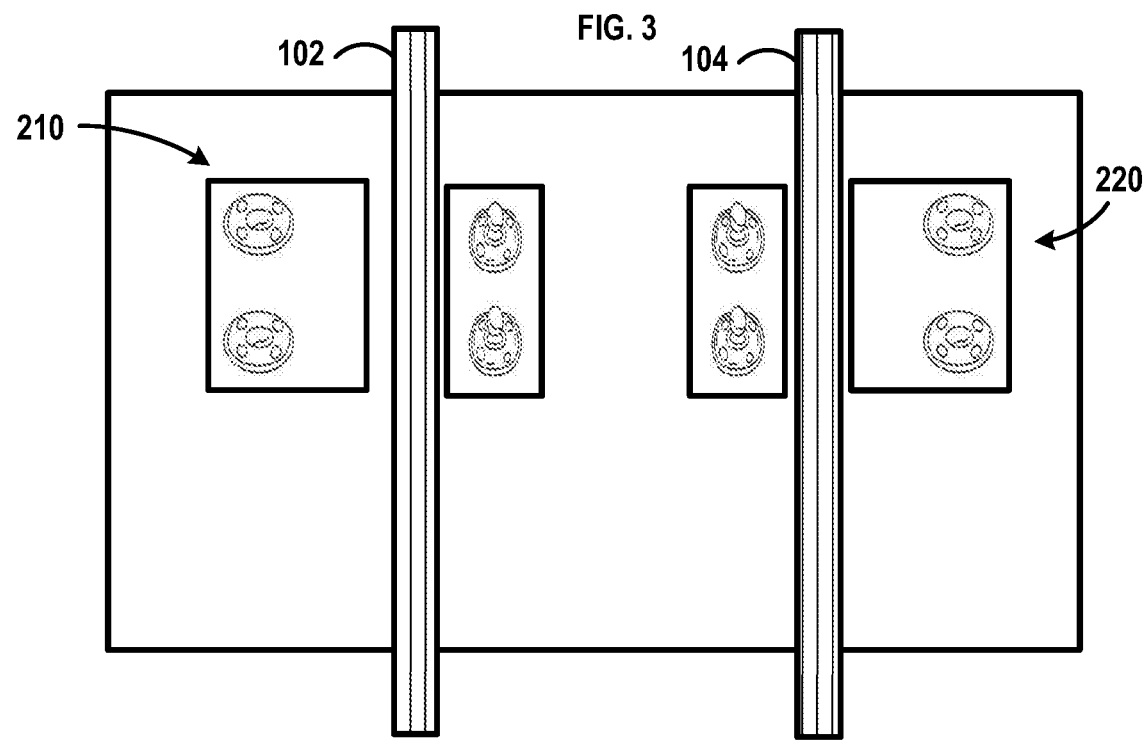
FIG. 3 shows a rear view of an example apparatus.

FIG. 3 shows a rear view of an exemplary apparatus 300 wherein the first coupling element and the second coupling element comprise one or more snap fasteners. For example, a snap fastener of the one or more snap fasteners may comprise a press stud, popper, snap, or tich, and/or one or more pairs of interlocking discs. In an embodiment, the one or more snap fasteners made from a hard material such as rubber, plastic, or metal. A first disc of the pair may comprise a circular lip. A second disc of the pair may comprise a groove. When pressed together, the circular lip of the first disc may fit snugly into the groove of the second disc so as to fasten the snap fastener. The first disc of the pair may be attached to either of the stationary base piece or the movable piece of either the first coupling element or the second coupling element. Likewise, the second disc of the pair may be attached to either of the stationary base piece or the movable piece such that the disc pair is configured to fasten the two respective pieces (e.g., the stationary bottom piece and the movable piece) together. Each of the first disc or second disc may be attached to either of the stationary base piece or the movable piece by way of riveting (e.g., a punch & die) or any other suitable means. For example, a first pair of snap fasteners comprising two male parts disposed on the stationary base piece may be configured so as to join with two female parts disposed on the movable piece. FIG. 3 shows the first coupling element 210 and the second coupling element 220 in an open position. In a closed position, the respective snaps may be "snapped" together, thereby securing the movable piece to the stationary base piece.

Figure 4:
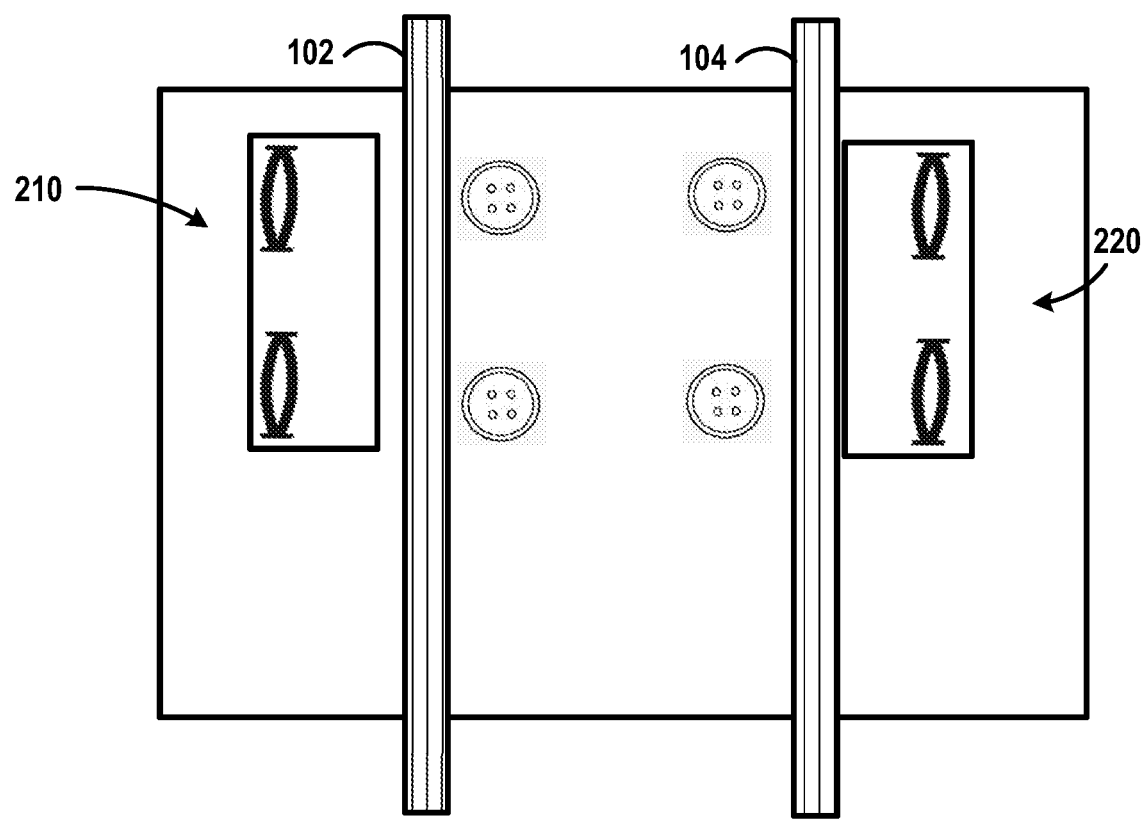
FIG. 4 shows a rear view of an example apparatus.
Figure 5:
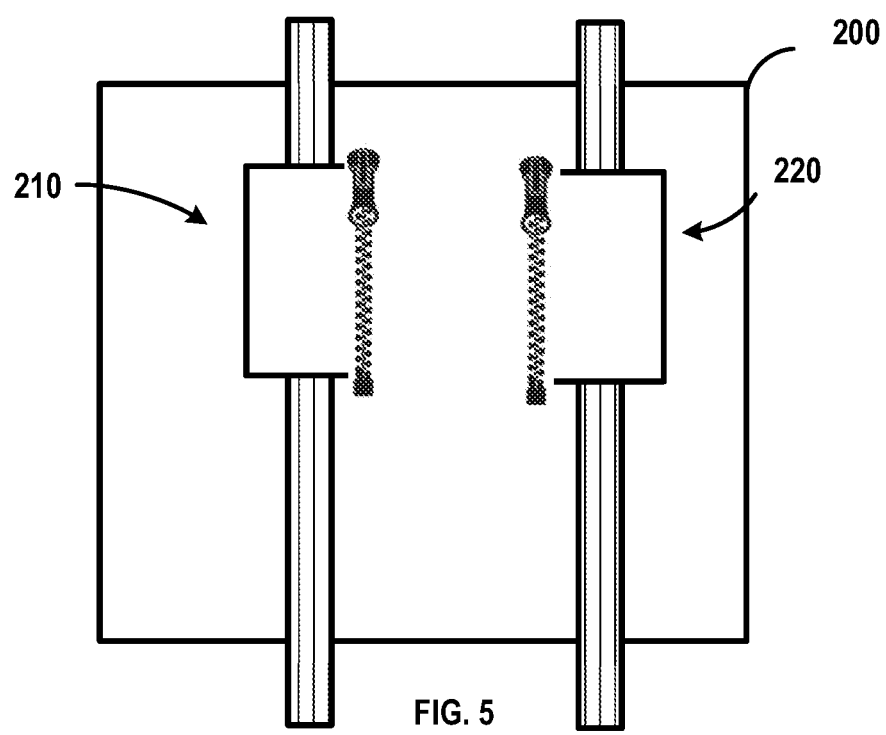
FIG. 5 shows a rear view of an example apparatus.

FIG. 4 shows an exemplary embodiment wherein the first coupling element and the second coupling element comprise one or more buttons and buttonholes. For example, a button of the one or more buttons may comprise a small fastener fashioned from rubber, plastic, metal, wood, combinations thereof or the like. In an embodiment, two buttons may be affixed to the stationary bottom piece and two buttons may be affixed to the stationary bottom piece. While the examples shown here feature two bottoms on each respective stationary base piece, the apparatus 200 may comprise any number of buttons and any number of button holes in any arrangement. FIG. 4 shows the first coupling element 210 and the second coupling element 220 in an open position. In a closed position, the respective buttons may be "buttoned," thereby securing the movable piece to the stationary base piece. FIG. 5 shown an exemplary embodiment wherein the first coupling element 210 and the second coupling element 220 comprise one or more zippers.

A method of keeping an infant warm when traveling secured in a seat is provided. The method includes the steps of: (i) placing an infant in a seat, such as a car seat or stroller, (ii) covering the infant with a travel blanket, the travel blanket comprising: a central section, lateral sections, a base section, coupling elements, and an open back construction so that the blanket is appointed to be placed upon the infant secured within the seat by way of safety straps; wherein the coupling elements are constructed within the central section of the blanket adjacent to each of the lateral sections; (iii) inserting the straps into each of the coupling elements, respectively, thereby securing the child within the seat by way of safety straps; and (iv) optionally, securing the lateral sections and the base section to the outer side portions and the outer bottom portion of the seat, respectively, while avoiding any need for adjusting the safety straps and jostling or otherwise disturbing the infant.

Although the foregoing invention has been described in some detail by way of illustration and example for purposes of clarity of understanding, certain changes and modifications may be practiced within the scope of the appended claims.

The invention claimed is:

1. A blanket apparatus comprising:
   a cover element comprising:
      a first surface; and
      an opposing second surface, wherein the first surface and the second surface form a single cover element; and
   a first coupling element comprising:
      a first movable piece; and
      a first stationary bottom piece releasably affixed by a hook-and-loop fastener to the cover element and configured to receive a first strap; and
      wherein the first movable piece is releasably affixed to the first stationary bottom piece by a zipper; and
   a second coupling element comprising:
      a second movable piece; and
      a second stationary bottom piece releasably affixed by a hook-and-loop fastener to the cover element and configured to receive a second strap; and
      wherein the second movable piece is releasably affixed to the second stationary bottom piece by a zipper.

2. The apparatus of claim 1, wherein the cover element comprises a fabric.

3. The apparatus of claim 1, wherein the first surface and the opposing second surface are joined by zippers.

4. The apparatus of claim 1, wherein the first stationary bottom piece of the first coupling element comprises a zipper, and wherein the second stationary bottom piece of the second coupling element comprises a zipper.

5. The apparatus of claim 1, wherein the first coupling element and second coupling element each comprise at least one button element and at least one receiving slot element that is complementary to a corresponding button element of the at least one button element.

6. The apparatus of claim 1, wherein the first coupling element and second coupling element each comprise at least one snap element and at least one snap receiving element that is complementary to a corresponding snap element of the at least one snap element.

7. The apparatus of claim 1, wherein the fastener comprises stitching.

8. The apparatus of claim 1, wherein the fastener comprises an adhesive.

9. The apparatus of claim 1, wherein the first coupling element and the second coupling element are removable from the cover element.

10. The apparatus of claim 1, wherein the first stationary bottom piece is permanently affixed to the first moveable piece, and wherein the second stationary bottom piece is permanently affixed to the second moveable piece.

11. A system comprising:
   a car seat comprising a back member and a seat member, wherein the car seat further comprises a first strap and a second strap, wherein the first strap comprises a first end and a second end and wherein the first strap is joined via the first end to the back member of the car seat and is configured to be joined via a second end to a seat member of the car seat and wherein the second strap is joined via a first end to the back member of the car seat and wherein the second strap is configured to be joined via a second end to a buckle;
   a cover element comprising a first surface and an opposing second surface, wherein the cover element comprises:
      a first coupling element comprising a first stationary bottom piece releasably affixed by a hook-and-loop fastener to the cover element and a first movable piece configured to engage, via one or more first hook-and-loop fasteners or one or more first zippers, the first stationary bottom piece, and wherein the first coupling element is configured to receive the first strap; and
      a second coupling element comprising a second stationary bottom piece releasably affixed by a hook-and-loop fastener to the cover element and a second movable piece configured to engage, via one or more second hook-and-loop fasteners or one or more second zippers, the second stationary bottom piece, wherein the second coupling element is configured to receive the second strap.

12. The system of claim 11, wherein the cover element comprises a fabric.

13. The system of claim 11, wherein the first surface and the opposing second surface are joined by zippers.

14. The system of claim 11, wherein the first stationary bottom piece of the first coupling element comprises a zipper, and wherein the second stationary bottom piece of the second coupling element comprises a zipper.

15. The system of claim 11, wherein the first coupling element and second coupling element each comprise at least one button element and at least one receiving buttonhole element.

16. The system of claim 11, wherein the first coupling element and second coupling element each comprise at least one snap element and at least one snap receiving element.

17. The system of claim 11, wherein the first coupling element and second coupling element each comprise stitching.

18. The system of claim 11, wherein the first coupling element and second coupling element each comprise an adhesive.

19. The system of claim 11, wherein the first coupling element and the second coupling element are removable from the cover element.

20. The system of claim 11, wherein the first stationary bottom piece is permanently affixed to the first moveable piece, and wherein the second stationary bottom piece is permanently affixed to the second moveable piece.

* * * * *